United States Patent [19]
Praveen et al.

[11] Patent Number: 5,768,425
[45] Date of Patent: Jun. 16, 1998

[54] METHOD AND SYSTEM FOR IMPROVED THRESHOLD BASED SCREENING

[75] Inventors: Kademada Ganapathy Praveen; Ramachandran Srinivasan, both of Bangalore Karnataka, India

[73] Assignee: Texas Instruments Incorporated, Dallas, Tex.

[21] Appl. No.: 555,660

[22] Filed: Nov. 13, 1995

[30] Foreign Application Priority Data

Jul. 14, 1995 [IN] India ............. 891/MAS/1995

[51] Int. Cl.$^6$ ................ G06K 9/36; G06K 9/46
[52] U.S. Cl. ....................... 382/232; 358/429
[58] Field of Search .................. 382/232, 237; 358/298, 456, 457, 458, 429, 534, 535, 536, 539

[56] References Cited

U.S. PATENT DOCUMENTS

| | | | |
|---|---|---|---|
| 5,204,753 | 4/1993 | Tai | 358/298 |
| 5,249,067 | 9/1993 | Hirosawa | 358/456 |
| 5,348,646 | 1/1995 | Godshalk et al. | 358/298 |
| 5,615,021 | 3/1997 | Lin | 358/485 |
| 5,633,729 | 5/1997 | Smith et al. | 358/456 |

OTHER PUBLICATIONS

Miller et al., Mean–preserving multilevel halftoning algorithm, Feb. 1993, 367–377, SPIE.

Primary Examiner—Joseph Mancuso
Assistant Examiner—Timothy M. Johnson
Attorney, Agent, or Firm—Tammy L. Williams; Robert L. Troike; Richard L. Donaldson

[57] ABSTRACT

In the present invention, an 8-bit input pixel gray level at a particular location in an image is screened, or compressed, down to k-bits where k is less than 8. A plurality of threshold tables are generated which represent a tone curve associated with the image in accordance with threshold table load logic (48). A preference matrix (42) which maps each pixel of the image to one of the threshold tables is generated using an image plane mapping interface (44) based on the input pixel location. An entry from the threshold table associated with the input pixel is selected using the gray level of the input pixel. The input pixel gray level is simultaneously compared with each of four thresholds in the selected entry using a quad comparator (58). A status register (60) is set based on the results for each comparison and is used to generate the k-bit output gray level associated with the input pixel.

5 Claims, 4 Drawing Sheets

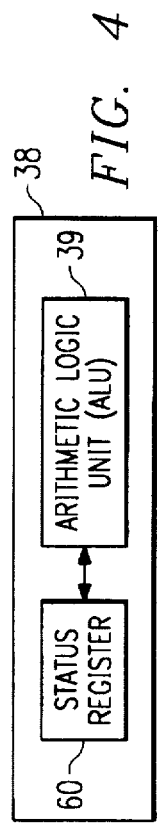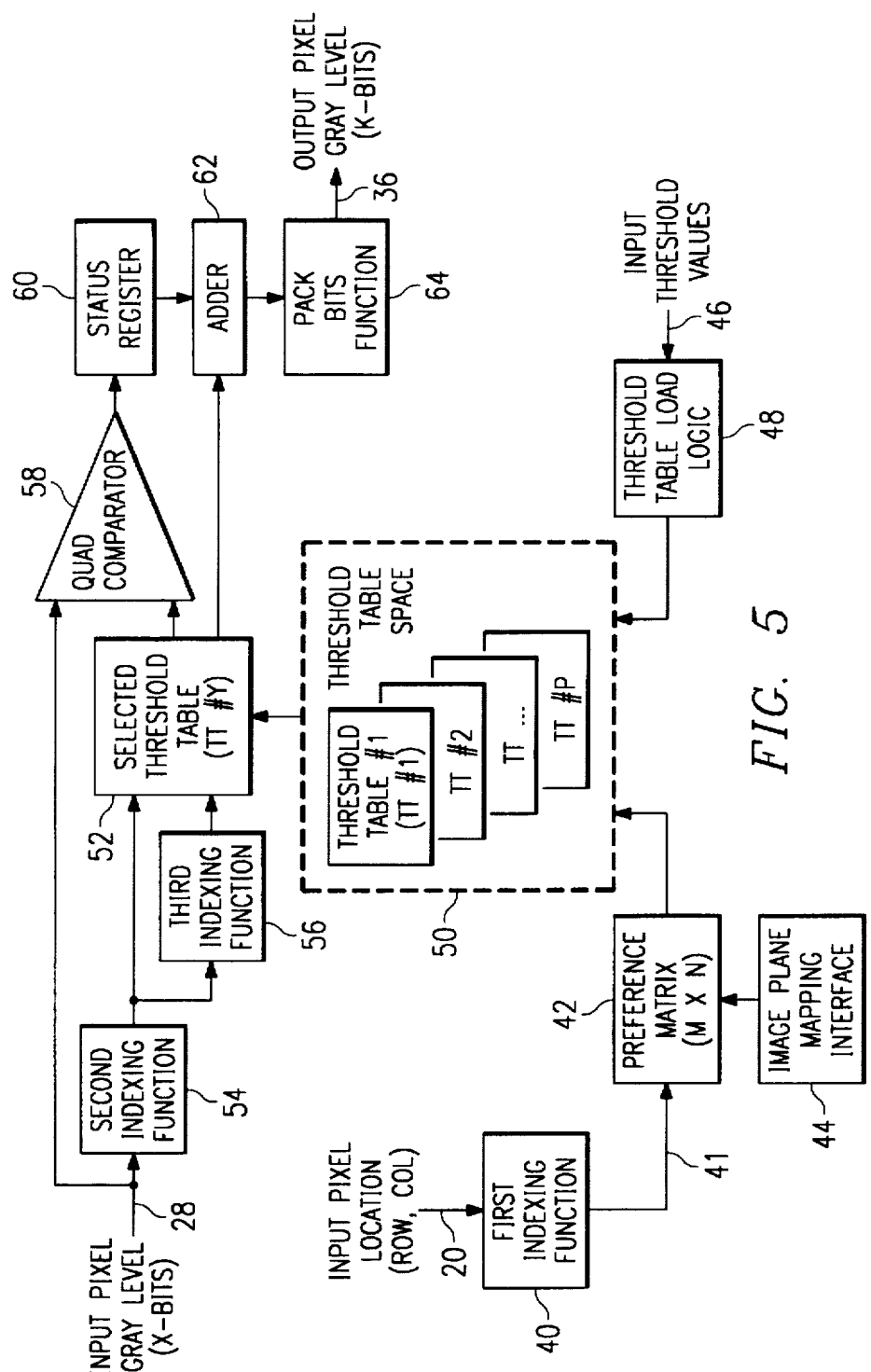
FIG. 4
FIG. 5

METHOD AND SYSTEM FOR IMPROVED THRESHOLD BASED SCREENING

TECHNICAL FIELD OF THE INVENTION

This invention relates in general to the field of image processing and in particular to a method and system for threshold based screening.

BACKGROUND OF THE INVENTION

When reproducing an image on a printing device, for example, it may not be possible, due to limitations in the printing process, to fully duplicate all of the tonal values of the original image. A human eye, however, cannot distinguish individual pixels beyond a certain resolution. Thus, by clustering individual pixels together, it is possible to create an illusion of continuous tone. This technique, wherein an illusion of continuous tone is created by exploiting the area modulation property of the human eye, is called screening.

In order to simulate $m^2+1$ gray levels, the number of gray levels in the original image, the original image is periodically tiled using a screen cell of size m×m. However, this reduces the resolution of the source image by a factor of m. FIG. 1 shows an example for generating a constant gray level of 3 using a 4×4 screen cell, such as exemplary screen cell 12, which includes 16 pixels. A pixel, such as exemplary pixel 10, is an unsigned 8-bit numerical value in a range of 0–255 which represents the brightness of a region in the original image shown in FIG. 1.

Several screening techniques, such as threshold-based screening and multi-level screening are well known.

In threshold-based screening, the process of quantizing an 8-bit input gray level at 28 down to k bits (where k is less than 8) is done by comparing the 8-bit input gray level with a threshold value. Based on the outcome of the comparison, a screened value is output.

FIG. 2 illustrates a binary level threshold-based screening. As shown at 20, the input pixel location row and column (r, c) to be quantized is used to index into a threshold array 26 using a modulo indexing function 22 which implements the modulo operator to generate as output at 24 row mod n and col mod m, where m and n correspond to the width and height, respectively, of the periodic tile pattern of the screen cell, such as the exemplary screen cell 12.

The threshold value at the computed location in the threshold array 26 is compared by comparator 30 with the 8-bit input gray value which enters at 28. A value of 1 is output at 32 if the 8-bit input gray level is greater than the threshold value. A value of 0 is output otherwise.

A second approach, multi-level threshold screening, illustrated in FIG. 3, is similar to threshold-based screening as discussed hereinabove but includes a few changes. First, instead of indexing into a two dimensional table of threshold values, a three dimensional lookup table (LUT) 34 is used where the third dimension includes 256 ($2^8$) entries, i.e., the LUT 34 is an array of size m×n×256.

Thus, in multi-level threshold screening, the row and column (r, c) location of the input pixel at 20 to be quantized is used to index into the first and second dimensions, respectively, by the modulo indexing function 22. Then, instead of comparing the 8-bit input gray value of the input pixel to the single threshold value found in the threshold array 26 at the computed location, the 8-bit input gray value is used at 28 as an index into the third dimension of the LUT 34 and a k-bit value stored at the computed location in the three dimensional LUT 34 is output at 36.

An alternative approach, threshold comparison, which optimizes memory usage involves replacing the m×n×256 entry LUT 34 by an m×n base table where each entry includes a reference to a 16-entry LUT, or tone curve. This reduction in the size of the m×n×256 entry LUT 34 is possible because when quantizing the 8-bit input gray level down to less than 8 bits, multiple entries in the m×n×256-entry LUT 34 are repeated.

In the threshold comparison approach, the input pixel location is used to index into the m×n base table. Then, assuming the referenced 16-entry LUT includes threshold values represented as $T_1, T_2, \ldots T_{16}$, where $T_i \leq T_{i+1}$, a given 8-bit input gray level ($g_{in}$) maps to a particular k-bit output value ($g_{out}$) based on the following equations:

$$0 \leq g_{in} < T_1; g_{out} = 0$$

$$T_1 \leq g_{in} < T_2; g_{out} = 1$$

$$T_2 \leq g_{in} < T_3; g_{out} = 2$$

$$T_{15} \leq g_{in} < 225; g_{out} = 15.$$

Although sufficient for certain applications, each of the above-mentioned screening approaches have limitations.

Binary threshold screening, such as the binary level threshold-based screening approach, is limited in that the 8-bit input gray level is quantized to only one of two values, 0 or 1. Thus, instead of generating an image of varying brightness, an image is generated in which each component pixel element is either on or off, or black or white.

Although the LUT based multi-level threshold screening approach is fast (requires one modulo indexing operation to determine the tone curve LUT corresponding to the pixel location and one indexing operation to determine the screened value based on the input gray level of the pixel), its memory requirements are considerable (m×n×256 bytes per LUT). In fact, this limitation becomes significant on processors like the TMS320C80, a general purpose digital signal processor (DSP) manufactured by the assignee Texas Instruments Incorporated, where on-chip memory is an extremely scarce resource.

On the other hand, the threshold comparison approach reduces the memory requirements considerably (requires only 16 bytes per LUT) but the time required to screen a pixel is higher. The threshold comparison approach requires one modulo indexing operation to determine the threshold table corresponding to the pixel location followed by two 4-way compares and two indexing operations to quantize the 8-bit input gray value of the pixel down to 4 bits based on the 16 thresholds.

SUMMARY OF THE INVENTION

In the present invention, an 8-bit input pixel gray level at a particular location in an image is screened, or compressed, down to k-bits where k is less than 8. A plurality of threshold tables are generated each of which represents a tone curve associated with the image in accordance with threshold table load logic. A preference matrix which maps each pixel of the image to one of the threshold tables is generated using an image plane mapping interface based on the input pixel location.

An entry from the threshold table associated with the input pixel is selected using the gray level of the input pixel. The input pixel gray level is simultaneously compared with each of four thresholds included in the selected entry using a quad comparator. A status register is set based on the results for each comparison and is used to generate the k-bit output gray level associated with the input pixel.

These and other features of the invention that will be apparent to those skilled in the art from the following detailed description of the invention, taken together with the accompanying drawings.

BRIEF DESCRIPTION OF THE DRAWINGS

FIG. 4 illustrates an exemplary processor;

FIG. 5 illustrates threshold screening using the present invention;

DETAILED DESCRIPTION OF THE INVENTION

Figure 1:
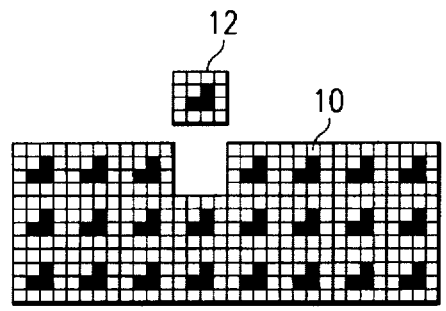
FIG. 1 shows an exemplary image tiled using a 4×4 screen cell size.
Figure 2:
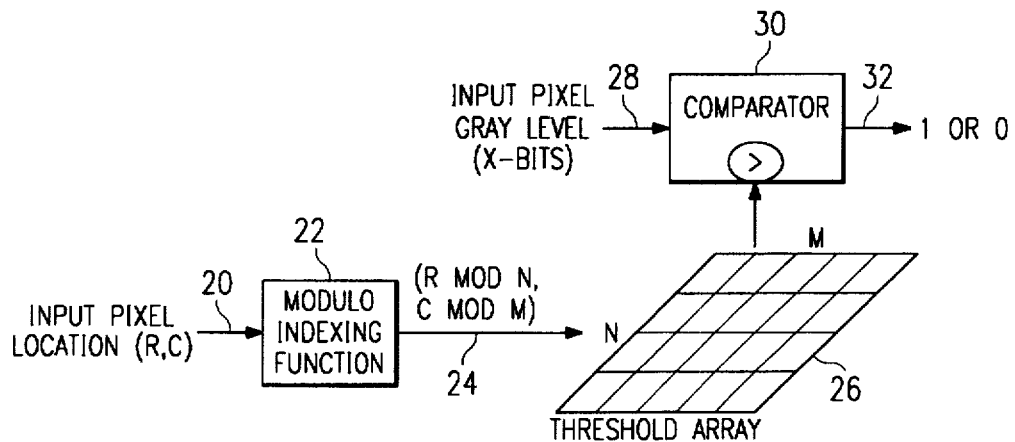
FIG. 2 illustrates a prior art threshold screening technique.
Figure 3:
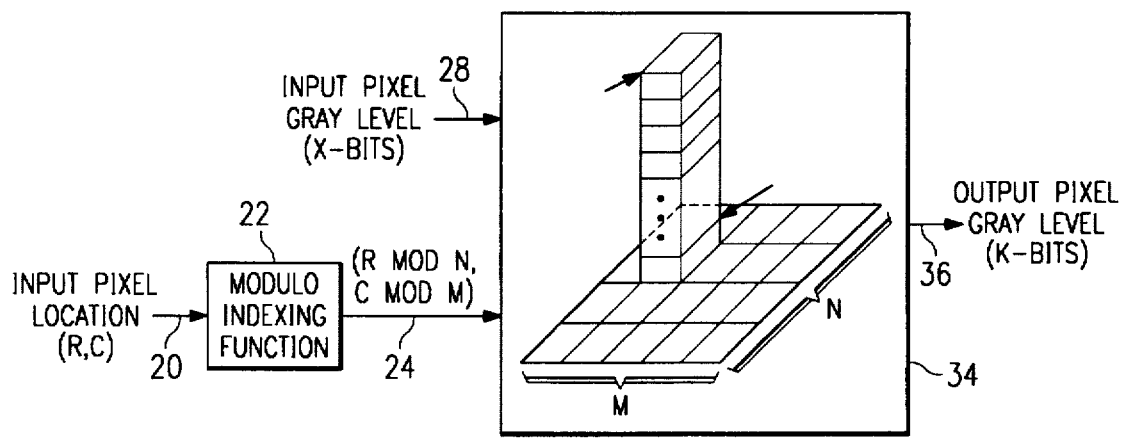
FIG. 3 illustrates another prior art threshold screening technique.

The present invention facilitates improved performance over the threshold comparison approach by reducing binary threshold screening, as illustrated in FIG. 2, by allowing for more than a simple mapping of the input pixel gray levels to a 1 or 0 based upon a comparison to a selected threshold value.

The present invention facilitates improved performance over the prior art threshold comparison approach by reducing the computation to one modulo indexing operation, one 4-way compare operation and two simple indexing operations for screening an 8-bit input pixel down to 4 bits. In terms of memory, the present invention requires 80 bytes per LUT as opposed to the 256 bytes per LUT required by the LUT based approach.

As shown in FIG. 4, the present invention may be implemented on a processor 38 which includes an arithmetic logic unit (ALU) 39 and a status register 60. An exemplary processor 38 is the TMS320C80, a product of the assignee, Texas Instruments Incorporated, as described in the 1994 TMS320C80 Technical Brief, herein incorporated by reference in it's entirety.

In the present invention, as illustrated in FIG. 5, the row and column of the input pixel location is input at 20 into a first indexing function 40. The first indexing function 40 in the current embodiment of the present invention is a modulo operation which generates row mod m and column mod n, where m and n are the number of rows and columns, respectively, in preference matrix 42, as output at 41. However, it is contemplated that another indexing function may be used.

The preference matrix 42 is a two-dimensional array, each element of which references one of a plurality of threshold tables stored in threshold table space 50. The referenced threshold table in the computed entry of the preference table 42 corresponds to the tone curve for the input pixel. The dimensions, m and n, of the preference matrix 42 correspond to the width and height, respectively, of the periodic tile pattern of the screen cell, such as exemplary screen cell 12 used to segment the represented image.

Image plane mapping interface 44 assists a user in defining the preference matrix 42 in accordance with the segmentation of the represented image.

In FIG. 5, the reference retrieved from the preference matrix 42 results in the selection of threshold table (TT#y) 52 from the threshold table space 50 for the input pixel location at 20.

Each threshold table in threshold table space 50 includes a plurality of threshold values input at 46 by a user in accordance with threshold table load logic 48. A given gray level, $g_{in}$ maps to $g_{out}$ based on the equations:

$$0 \leq g_{in} < T_1 \rightarrow g_{out} = 0$$

$$T_1 \leq g_{in} < T_2 \rightarrow g_{out} = 1$$

$$T_{15} \leq g_{in} < 255 \rightarrow g_{out} = 15$$

Based on their values, the thresholds $T_1, T_2, \ldots T_{15}$ are placed in a threshold table comprising of sixteen 4-byte table entries using the threshold table load logic 48. Each 4-byte table entry includes a maximum of 4 thresholds. A particular threshold, $T_i$, is mapped to table entry j if:

$$\text{int}(T_i \text{ div } 16) = j.$$

For example, if, for a particular tone curve, the thresholds $T_1, T_2,$ and $T_3$ lie in the range [0–15] and $T_1 < T_2 < T_3$, then the 0th 4-byte table entry corresponding to that particular tone curve will include the thresholds 255, $T_1, T_2,$ and $T_3$. Since less than 4 thresholds are entered into the 0th 4-byte table entry, the unoccupied most significant byte in the 0th table entry is filled with 255 (OXFF).

Figure 7:
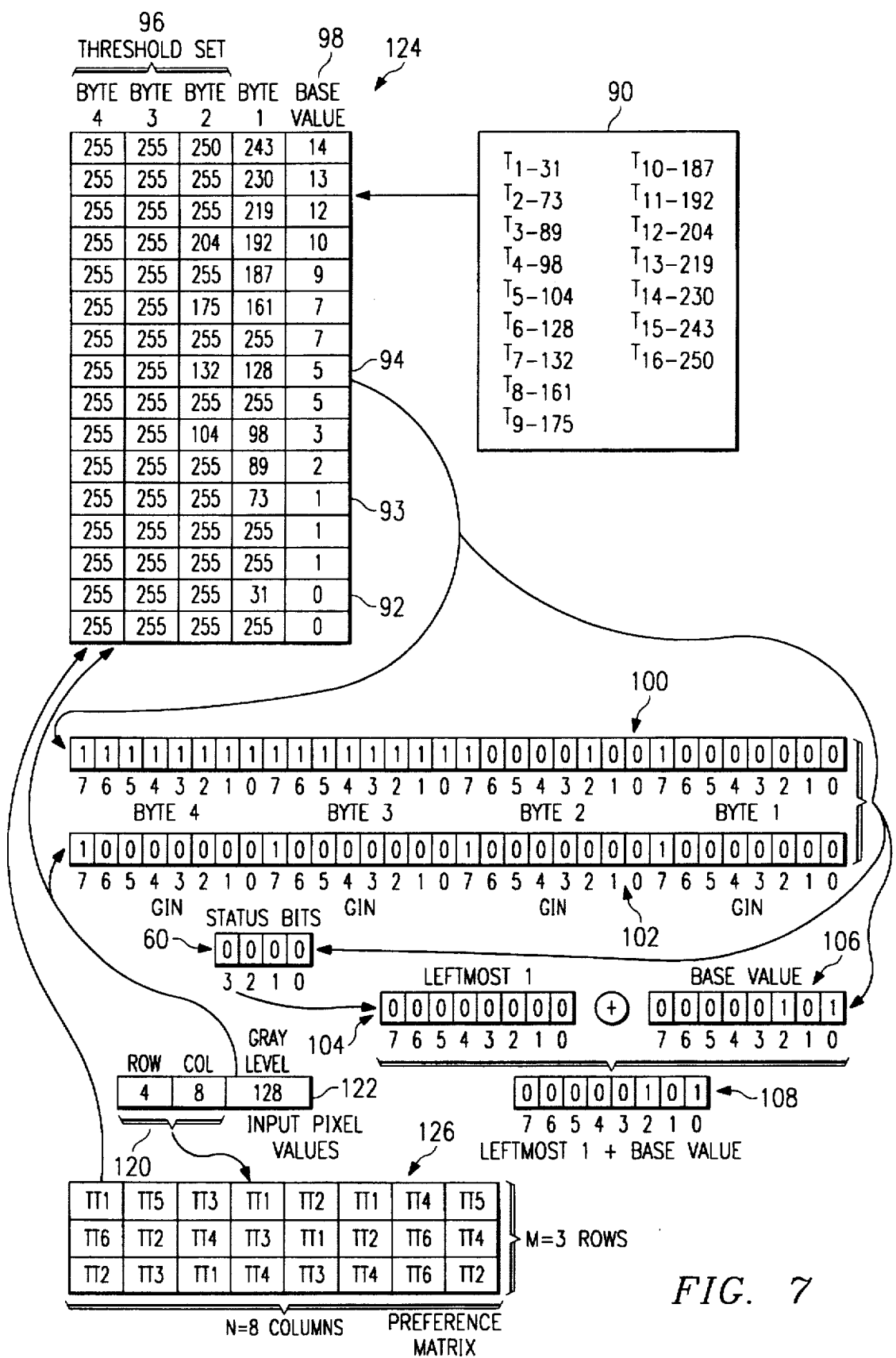
FIG. 7 shows an example illustrating threshold screening using the present invention.

Furthermore, if the range between two consecutive thresholds spans across multiple table entries, i.e., if $(T_j - T_i) > 16$ where $j \geq i+1$, then the first byte of each of the spanned table entries from i+1 to j−1, is filled with $T_i$. FIG. 7, discussed in more detail hereinbelow, illustrates an exemplary threshold table 52 for the case where an input threshold group 90 includes thresholds $T_1$ (which has a value of 31 and thus lies in the range for table entry # 1 at 92 in FIG. 7) and $T_2$ (which has a value of 73 and thus lies in the range for table entry #4 at 93 in FIG. 7), and $T_2 - T_1 > 16$.

Each threshold table entry also has an associated base value entry. If, for example, $[T_i, T_j, \ldots T_k]$ is the set of thresholds corresponding to a particular threshold table entry, where i<j<k, then the base value for that particular threshold table entry is (i−1). FIG. 7 also shows the base values defined for the example described hereinabove. For table entry #1, the base value is 0. For table entry #4, the base value is 1.

Returning to FIG. 5, a second indexing function 54, $f(g_{in})$, accepts as input the input pixel gray level at 28 and generates the relative address of the 4-byte table entry within the selected threshold table (TT #y) 52 corresponding to the input pixel. In the current embodiment of the present invention, the second indexing function 54 uses the upper 4 bits of the input pixel gray level to compute the index into the selected threshold table (TT #y) 52 although it is contemplated that other indexing functions can be used.

A third indexing function 56, $h(g_{in})$, using the results of the second indexing function 54, generates the relative address of the base value entry within the selected threshold table (TT #y) 52 corresponding to the input pixel. In the current embodiment of the present invention, $h(g_{in}) = 5 \times f(g_{in}) + 4$ although it is contemplated that other indexing functions may be used.

Some processors, like the TMS320C80, include a 32-bit arithmetic logic unit (ALU) 39 which can be split to perform four 8-bit operations simultaneously (within one dock cycle). The status register 60 holds four bits of status data based upon the results of the ALU 39 operations for each split.

The quad comparator 58 uses a single instruction multiple data (SIMD) compare operation executed by the ALU 39 to compare the four 8-bit threshold values in the selected table entry with the input pixel gray level. The outcome of the compare operation is determined from the four status bits in the status register 60. The status bit corresponding to a particular byte slice of the 32-bit ALU holding one of the 8-bit threshold values is set to 1 if the 8-bit input gray level is greater than or equal to that 8-bit threshold value.

The leftmost one in the status register 60 is determined and added by adder 62 to the base value of the table entry as computed by the third indexing function 56 to generate a screened 4-bit pixel.

A pack function 64 then merges the screened 4-bit pixels into 1 byte.

Figure 6:
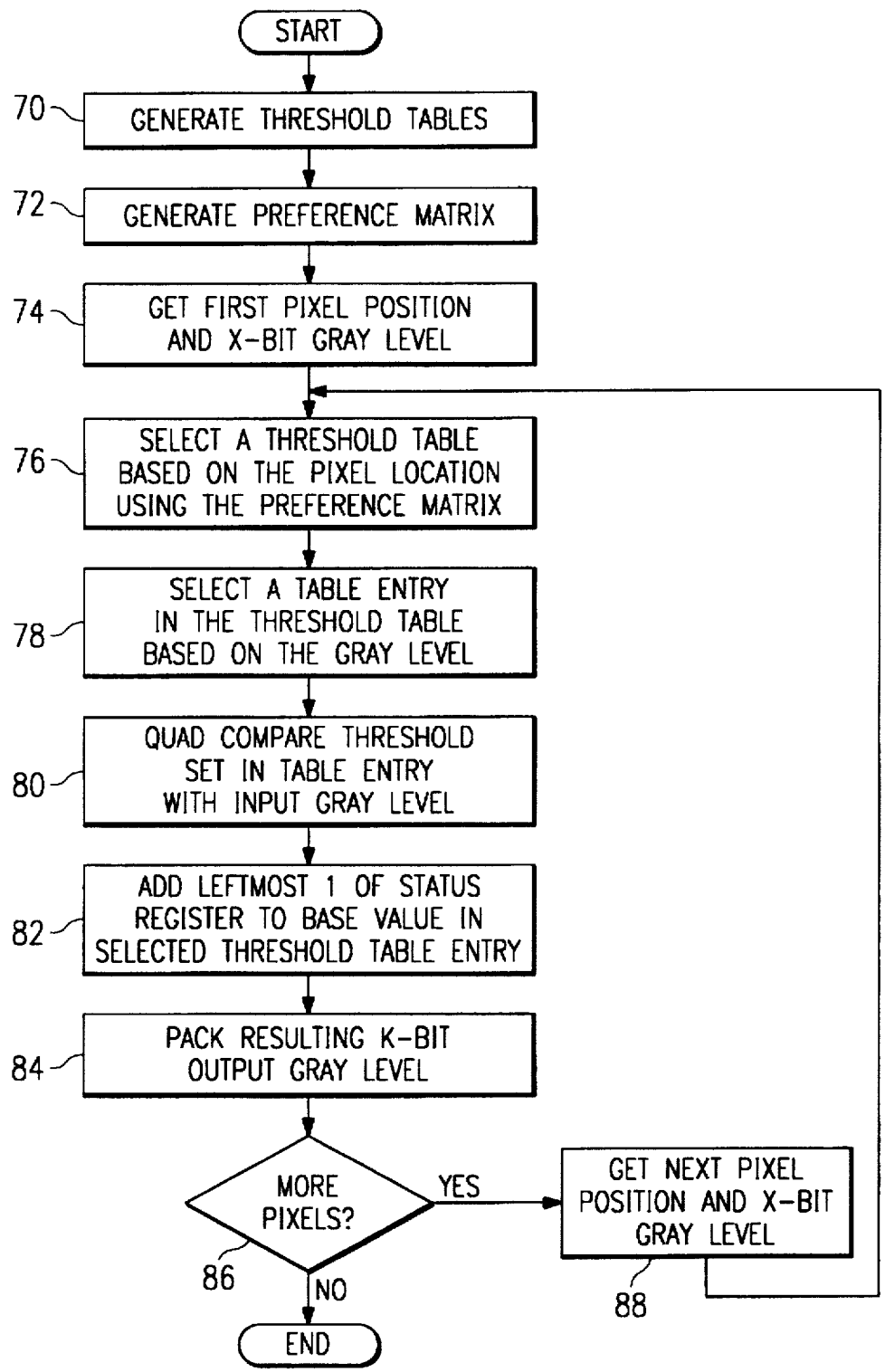
FIG. 6 depicts a flow diagram illustrating threshold screening using the present invention.

FIG. 6 shows a flow diagram illustrating the present invention. First, the threshold tables are generated based upon the tone curves at block 70. Then, the preference matrix 42 is generated at block 72.

The first input pixel position and 8-bit gray value are provided at block 74. Based on the location of the input pixel, the preference matrix 42 is used to select a threshold table at block 76. Using the input pixel gray value to index into the selected threshold table, a table entry is extracted from the threshold table at block 78. The extracted threshold table entry includes a set of four threshold values and a base value.

At block 80, the set of threshold values are each simultaneously compared to the input pixel gray level, the results of which set bits in the status register 60. The leftmost one in the status bits set by the quad compare operation are added to the extracted base value at block 82 to get the 4-bit screened output corresponding to the input pixel gray level. At block 84 the screened 4-bit pixel output is merged into 1 byte.

At decision block 86, if there are more input pixels to process, the next pixel position and 8-bit gray level are retrieved at block 88 and operation continues at block 76. If, at decision block 86, there are no more pixels to process, the procedure terminates.

FIG. 7 shows an example illustrating the operation of the present invention. A set of user defined exemplary threshold values 90 are input into exemplary threshold table #5 124 using the threshold table load logic 48. A reference to exemplary threshold table #5, as shown in exemplary preference matrix 126, was determined by the first indexing function 40 using exemplary input pixel position 120 with row and column values of 4 and 8, respectively.

Using exemplary input pixel gray level 122 with a value of 128 and the second indexing function 54, exemplary table entry #5 94 was selected from the exemplary threshold table #5 124. The threshold values in exemplary table entry #5 94 are stored in a first input register 100 of the ALU 39. The exemplary input pixel gray value is stored in a second input register 102 of the ALU 39. The quad comparator 58 then compares the values in the first input register 100 and the second input register 102 and sets the status bits in the status register 60 accordingly.

The leftmost one 104 in the status register 60 is added to the base value 106 of the exemplary table entry #5 94 resulting in the screened 4-bit output gray level at 108.

A typical application for the present invention is in real time multi-level threshold screening which is an integral part of embedded raster image processing software. The present invention contributes to real time embedded performance constraints, both in terms of memory usage and processing time. Moreover, an implementation of the present invention on the TMS320C80 which screens 8-bit pixels down to 4 bits at the rate of 3.5 cycles/pixel is feasible.

Although the present invention and its advantages have been described in detail, it should be understood that various changes, substitutions and alterations can be made herein without departing from the spirit and scope of the invention as defined by the appended claims.

What is claimed is:

1. A method for screening an input pixel gray level from x bits to y bits where y is less than x, said input pixel defining a location in an image, the method comprising the steps of:

storing a plurality of threshold values to each of a plurality of threshold tables, each of said plurality of threshold tables having an associated maximum number of entries, in accordance with threshold table load logic;

said step of storing a plurality of threshold values includes the step of mapping a particular threshold value, $T_i$, where $T_i$ is a reference number associated with said particular threshold value to a row j, in a particular threshold table if $T_i$ divided by said associated maximum number of entries is greater than or equal to j and less than j+1;

partitioning said image into a plurality of screen cells;

mapping one of said threshold tables to each of said screen cells to generate a preference matrix;

selecting one of said threshold tables from said preference matrix in accordance with said input pixel location to generate a selected threshold table;

selecting a table entry from said selected threshold table in accordance with said input pixel gray level, said table entry representing a row in said threshold table and including a portion of said threshold values and an associated base value; and simultaneously comparing said input pixel gray level with said portion of said threshold values in said selected table entry to generate a y-bit output pixel gray level.

2. The method of claim 1 wherein said comparing step includes the steps of:

storing a resulting value in a status register in response to said comparing step;

adding said associated base value to a left-most bit position in said status register to generate said y-bit output pixel gray level.

3. The method of claim 1 wherein said step of mapping a particular threshold value, $T_i$, includes the step of:

mapping said particular threshold value, $T_i$, to all rows in a predefined range if $T_j - T_i$ is greater than said associated maximum number of entries, where $T_j$ represents another threshold value and j is greater than i.

4. The method of claim 3 wherein said predefined range is from i+1 to j−1.

5. A system for screening an input pixel gray level from x bits to y bits where y is less than x, said input pixel defining a location in an image, comprising:

threshold table load logic for entering a plurality of threshold values and for storing each of said threshold values, $T_i$, to a table entry j of one of a plurality of threshold tables, each of said plurality of threshold tables having an associated maximum number of entries, if said threshold value, $T_i$, divided by said associated maximum number of entries is greater than or equal to j and less than j+1;

an image plane mapping interface for defining a preference matrix, said preference matrix used to associate said threshold tables with said image;

a first indexing function for determining which of said threshold tables is associated with said input pixel in accordance with said location in said image to generate a selected threshold table;

a second indexing function for selecting a threshold set of said threshold values in said selected threshold table, said threshold set having an associated base value;

said base value depending on an associated number of output levels and distribution of threshold values in said threshold table;

a third indexing function for selecting said associated base value of said threshold set being selected;

a quad comparator for simultaneously comparing each threshold value in said threshold set to said input pixel gray level and for setting bits in a status register in response to said comparison;

an adder for adding in a left-most bit of said status register, set by said quad comparator, to said selected associated base value to generate an output pixel gray level.

* * * * *